United States Patent Office 3,029,291
Patented Apr. 10, 1962

3,029,291
METHOD FOR MAKING ALKYLIDENEBIS (DIBROMOPHENOLS)
Andrew J. Dietzler, Midland, Mich., assignor to The Dow Chemical Company, Midland, Mich., a corporation of Delaware
No Drawing. Filed Mar. 12, 1959, Ser. No. 798,849
8 Claims. (Cl. 260—619)

The present invention relates to a new and useful method for making alkylidenebis(dibromophenols). It is more particularly concerned with a new process for the production of the tetrabromo compounds in higher purity and greater yields than heretofore thought possible.

The known processes for the production of the alkylidenebis(dibromophenol) [Zincke and Grüters, Ann. 343 86 (1905)], have employed acetic acid as a solvent and recovered a product having a melting point of 162° to 163° C. Marsh, Butler and Clark, Ind. Eng. Chem., 41, 2177 (1949) in their process obtained the alkylidenebis (dibromophenol) product melting at 155°–160° C. Bralley, British Patent No. 614,235, granted in 1948, gives the melting point of the product as 160°–161° C. Applicant has now been able to produce the 4,4'-isopropylidenebis(2,6-dibromophenol) having a melting point within the range of 173°–178° C., in high yields of approximately 95% purity.

The process of the present invention comprises brominating a bisphenol in a lower aliphatic alcohol as the reaction solvent. Good yields of the desired product are obtained when the alcohol is a 60 to 90%, by weight, aqueous solution of the alkanol; when the bromination reaction is carried out at temperatures of between about 0° and 50° C. and over a period of from about 1 to 10 hours and preferably where the bromine is added at such a rate that the bromination is complete in between about 4 and about 6 hours. Upon the completion of the bromination, it is advantageous to maintain the reaction mixture at a temperature below about 50° C. for a period of time of from about 1 to about 18 hours and preferably for about 5 hours, during which time the reaction mixture is continuously agitated. Good results are obtained when the molar ratio of the reactants is from about 4 to about 4½ moles of bromine per mole of diphenol.

Substantially any of the lower alkanols, and preferably those which are water-miscible, can be employed as the reaction solvent. Thus, one can employ aqueous methyl, ethyl, or propyl alcohol.

The following examples are illustrative of the present invention but are not to be construed as limiting.

Example 1 p,p'-Isopropylidenediphenol, 684 g. (3 moles) was dissolved with stirring in 1050 ml. of methyl alcohol. To this solution was added 450 ml. of water. The solution was warmed to 42° C. and 1920 g. (12 moles) of bromine was slowly added below the surface of the liquid with good stirring and with cooling at 39.5–42° C. over a 4.3 hour period. Thereafter the reaction mixture was kept at about 40° C. for 2 hours; cooled to 24° C. and let stand at room temperature over the weekend. The reaction mixture was then filtered and the crystals which had formed and were washed eight times with 2000 ml. portions of water and dried. A 4,4'-isopropylidenebis (2,6-dibromophenol) product as a light yellow solid having a M.P. 173.5–176.5° C. was obtained. This represented a 96.4% yield. This product gives a constant melting point of 181°–182° C. when purified by recrystallization from isopropyl alcohol.

Example 2

Three moles (684 g.) of p,p'-isopropylidenediphenol was dissolved in a solution of 1050 ml. of methyl alcohol and 450 ml. of water. This mixture was cooled to 17.5° C. and 1920 g. (12 moles) of bromine then added at 17.5–23° C. over a 4 hour period with good agitation and with cooling. After the bromine was all added the reaction mixture was kept at 21–23° C. with stirring for three hours.

The mixture was then blown with nitrogen for 25 minutes and filtered. The crystals on the filter were washed twice with 950 ml. portions of water on the filter, and finally washed in a 12″ centrifuge until free of HBr. A portion of the wet cake was dried in a vacuum oven at 42° C. and a portion air-dried overnight. Both portions were very light tan in color and melted at 173–175.5° C. A total of 1575 g. of a 4,4'-isopropylidenebis(2,6-dibromophenol) product was obtained. The yield was 96.5%.

The mother liquor and the first two water washes above were neutralized with 30% NaOH and distilled through a 1½″ x 5′ column packed with 0.25″ Berl saddles. Methyl alcohol (724.7 g.) was obtained. This is an 87% recovery of the alcohol which can be reused in the process.

Example 3

In the manner of Example 2 but employing a reaction temperature of 3° to 6.5° C; a bromine addition time of 4.5 hours; and a soaking time of 17.5 hours, there was obtained a yield of 95% of a 4,4'-isopropylidenebis(2,6-dibromophenol) product as a very light tan solid having a M.P. of 173–177° C.

Example 4 p,p'-Isopropylidenediphenol, 684 g. (3 moles) was dissolved in a solution of 450 cc. of water in 1050 cc. of methanol. This solution was heated at 40° C. and 2109.6 g. (12.6 moles) of bromine then added portionwise with stirring over a 3.7 hour period while maintaining the temperature of the reaction mixture at 39–42° C. Upon completion of the addition of bromine the reaction mixture was maintained at a temperature of 41–45° C. for 2 hours longer. In this run 16.2 g. of methyl bromide was isolated. The reaction mixture was filtered at 25° C. and the solid product washed with water until free of hydrobromic acid. It was then dried at 42°–44° C. in a vacuum oven. A 4,4'-isopropylidenebis(2,6-dibromophenol) product as a deep pink solid having a M.P. 173–178° C. was obtained. The yield product was 96.3%.

Examples 5–13

In the table below is shown the effect of methanol concentration and solvent volume on the yield and melting point of the 4,4'-isopropylidenebis(2,6-bromophenol) product obtained by carrying out reactions in the manner of the foregoing examples.

| Ex. No. | Wt. percent Methanol | ml. MeOH | ml. Water | Percent Yield | M.P. (° C.) |
|---|---|---|---|---|---|
| 5 | 100 | 456 |  | 53.5 | 181–182 |
| 6 | 66.3 | 250 | 100 | 98 | 161–176.5 |
| 7 | 73.5 | 350 | 100 | 96 | 174–178 |
| 8 | 84.8 | 350 | 50 | 96.5 | 173–177 |
| 9 | 65.0 | 350 | 150 | 97.3 | 173.5–178.5 |
| 10 | 73.5 | 350 | 100 | 97.5 | 174–177.2 |
| 12 | 52.5 | 350 | 250 | 96.5 | 167–177.5 |
| 13 | 65 | 1,050 | 450 | 96.3 | 174–178 |

Ex. No. 5 was a 0.5 mole run and Ex. 13 a 3-mole run. All others were made with 3 moles of p,p'-isopropylidenephenol and in the manner of Example 4. In each run 4 moles of bromine was used per mole of p,p'-isopropylidene-diphenol. These runs were all made at 36–44° C., with a soaking time of 2 hours.

Example 14 p,p'-Isopropylidenediphenol, 684 grams (3.0 moles), was dissolved in a solution of 450 milliliters of water in 1050 milliliters of 2B absolute ethyl alcohol. To this solution with stirring and cooling was added portionwise 1920 grams (12 moles) of bromine at 17° to 23° C. over 4.3 hours. The reaction mixture was then maintained at 21 to 23° C. for 0.75 hour and then filtered. The crystalline product was washed with water until free of hydrobromic acid and then dried at 42°–44° C. in a vacuum oven. As a result of these operations there was obtained 1529 grams of a 4,4'-isopropylidene bis(2,6-dibromophenol) product as a light tan powder having a melting point of 170°–174.5° C. This represents a yield of 93.5%.

Example 15

67.5 grams (0.25 mole) p,p'-cyclohexylidene diphenol in a solution of 140 ml. of methanol was brominated at 20–25° C. in 1 hour with 159.8 g. (1 mole) of bromine. This mixture was kept at 20–25° C. for 16 hours. 60 ml. of water was added to the reaction mixture and an oil separated. The lower oil layer was separated. This oil layer was heated in the steam bath to remove methanol. The oil crystallized and was washed with water to remove hydrogen bromide and dried. There was obtained 140 g. of a 2,2'-cyclohexylidene-bis(2,6-dibromophenol) product having a M.P. 127–130° C. A portion of this material was recrystallized from ethylcyclohexane to obtain a 4,4'-cyclohexylidene bis(2,6-bromophenol) product having a M.P. of 134.5–135.5° C.

Example 16

121.1 grams (0.5 mole) of p,p'-sec.-butylidenediphenol in a solution of 75 ml. of water in 175 ml. of methyl alcohol was brominated with 320 grams (2 moles) of bromine at 39–40° C. in 2 hours. The reaction mixture was stirred at 33–41° C. for 17 hours and then filtered. The crystal residue in the filter was washed four times with 800 ml. portions of water to remove the hydrogen bromide. The washed crystals were dried at 35–38° C. for 16 hours. 269 grams of a 4,4'-sec.-butylidenebis (2,6-dibromophenol) product having a M.P. 146.5°–149° C. was obtained. The yield was 96.5%. This material was recrystallized from ethylcyclohexane to obtain a product having a M.P. of 153–154° C.

Example 17

228.3 grams (1 mole) of p,p'-isopropylidenediphenol was dissolved in a solution of 150 ml. of water in 350 ml. of isopropyl alcohol. To this solution with stirring and cooling was added 650 grams (4 moles) of bromine at 19–25° C. for 17.5 hours and then filtered. The crystalline product was washed with water until free of hydrogen bromide and dried in a vacuum oven at 35–40° C. for 16 hours. A 4,4'-isopropylidenebis(2,6-dibromophenol) product was obtained as an off-white in color solid and had a M.P. of 172.8–174.5° C. The yield was 95.5%.

Example 18

228.3 grams (1 mole) of p,p'-isopropylidenediphenol was dissolved in a solution of 150 ml. of water in 350 ml. of isopropyl alcohol. To this solution with stirring and cooling was added 640 grams (4 moles) of bromine at 19–25° C. in 2 hours. The run was kept at 20–25° C. for 17.5 hours and then filtered. The crystalline product was washed with water until free of hydrogen bromide and dried in a vacuum oven at 35–40° C. for 16 hours. A 4,4'-isopropylidenebis(2,6-dibromophenol) product was obtained as an off-white solid and had a M.P. of 172.8–175.5° C. The yield was 95.5%.

Example 19

In the manner of Example 18 using n-propyl alcohol in place of isopropyl alcohol there was obtained a 97.2% yield of a 4,4'-isopropylidenebis(2,6-dibromophenol) product as a slightly tan colored solid having a melting point of 172°–179° C.

I claim:
1. A method for producing an alkylidenebis(dibromophenol) which comprises reacting an alkylidenebisphenol with about 4 to 4.5 molar equivalents of bromine in the presence of an aqueous lower alkanol solvent having from 1 to 3 carbon atoms, at a temperature between about 0° and about 50° C.
2. The process of claim 1 wherein upon the completion of the addition of the bromine the reaction mixture is aged for from about 1 to about 18 hours at about the reaction temperature with continuous agitation and subsequently filtered to recover the alkylidenebis(dibromophenol).
3. The process of claim 1 wherein the alkanol is methanol.
4. The process of claim 1 wherein the alkanol is isopropanol.
5. The process of claim 1 wherein the alkanol is n-propanol.
6. The process of claim 1 wherein the alkylidenebisphenol is 4,4'-isopropylidenediphenol.
7. The process of claim 1 wherein the alkylidenebisphenol is 4,4'-sec.-butylidenediphenol.
8. The process of claim 1 wherein the alkylidenebisphenol is 4,4'-cyclohexylidenediphenol.

References Cited in the file of this patent

UNITED STATES PATENTS

| | | |
|---|---|---|
| 1,760,758 | Korten | May 27, 1930 |
| 2,468,982 | Jansen | May 3, 1949 |
| 2,542,972 | Thompson | Feb. 27, 1951 |

OTHER REFERENCES

Groggins: "Unit Processes In Organic Synthesis," page 230 (1 page) Pub. by McGraw-Hill Book Co., New York (1952).